Sept. 20, 1949.
A. MEYERHOFF
2,482,591
MEANS FOR DETERMINING THERMODYNAMIC
PROPERTIES OF FLUIDS
Filed Sept. 7, 1946
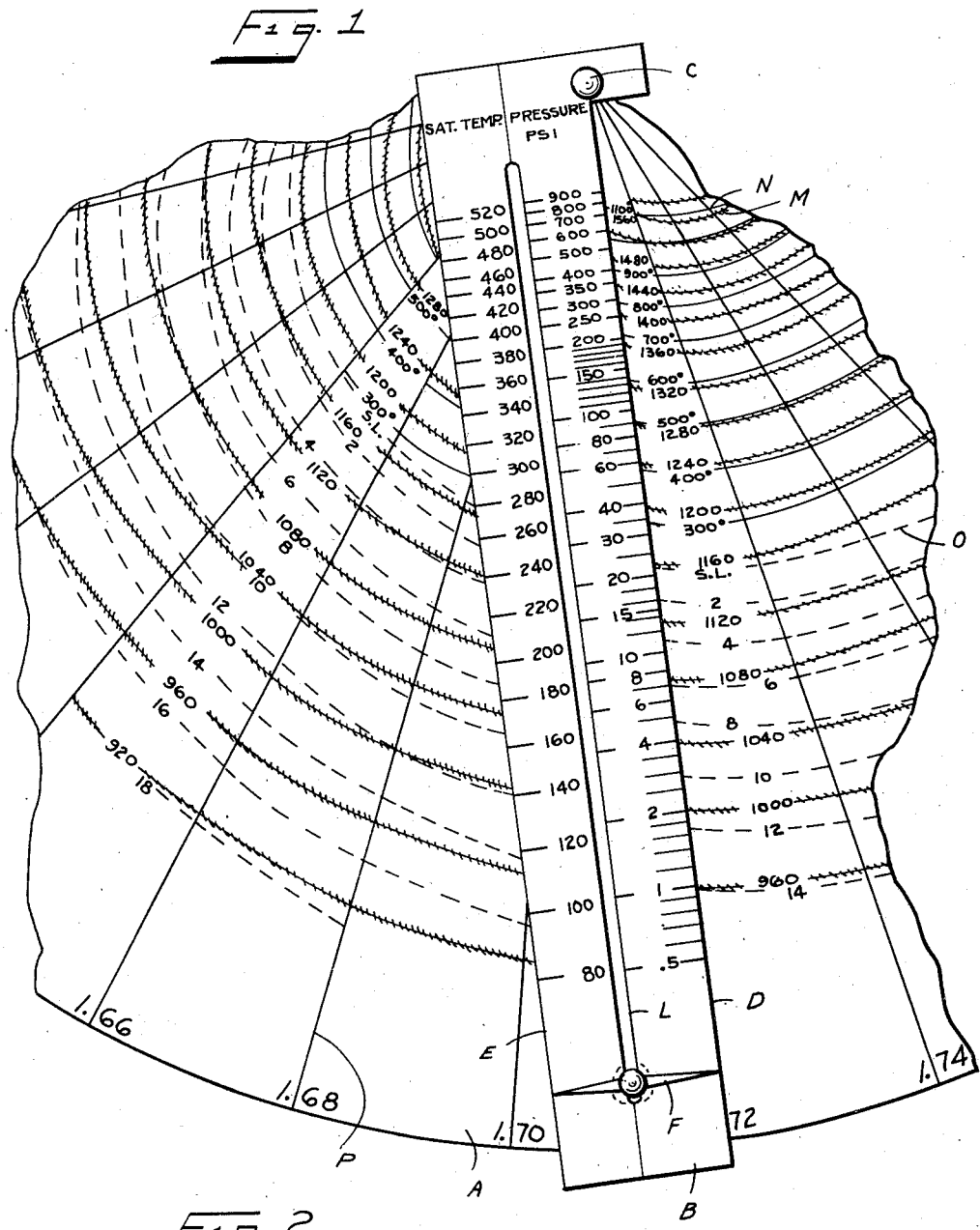
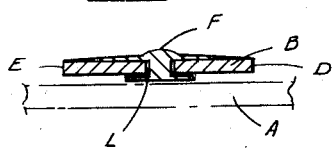
INVENTOR.
ARTHUR MEYERHOFF
BY
ATTORNEYS Patented Sept. 20, 1949

2,482,591

UNITED STATES PATENT OFFICE 2,482,591

MEANS FOR DETERMINING THERMO-DYNAMIC PROPERTIES OF FLUIDS

Arthur Meyerhoff, Brooklyn, N. Y.

Application September 7, 1946, Serial No. 695,482

5 Claims. (Cl. 235—67)

This invention relates to a device for determining the thermodynamic properties of fluids.

One object of this invention is to provide a circular calculating device to replace the ordinary Mollier Diagram.

In using the Mollier Diagram, the operator is confronted by a maze of lines. Each group of lines, distinguished from the other groups by its direction, represents lines of constant pressure, constant temperature, constant enthalpy, constant entropy or constant quality. To locate a point on this diagram in the superheated region, when one knows the pressure (absolute) and temperature of the steam, the intersection of that pressure and temperature line on the Mollier Diagram is found and at that point the enthalpy and entropy can be found.

The calculator of the present invention makes this process simple and less confusing. In general, the device of the present invention comprises a circular disc containing an indicator which is rotatably mounted at the center thereof. This disc contains three spiral scales which represent constant temperature lines, constant enthalpy lines, and constant quality lines. The disc also contains radial lines which indicate constant entropy. The rotatable indicator is so constructed as to have one edge thereof radial with respect to the disc. And the indicator preferably contains two scales indicating pressure and corresponding saturation temperature.

To locate a point on the steam calculator of the present invention the pressure is located on the rotatable indicator, the indicator then being rotated till the temperature line on the disc meets the pressure point, and the enthalpy or entropy can then be found. The operator will find it much easier to turn the indicator till the temperature line meets the pressure point on the indicator than to follow a pressure line on the Mollier Diagram till it intersects the desired temperature line. Secondly, it is easier for the operator to find the pressure point on the steam rule indicator than to "hunt" through a maze of lines on a Mollier Diagram till he finds the pressure line.

If after the initial point is found, the operator desires to follow an isentropic expansion or compression, he must, when using the Mollier Diagram follow an entropy line from the previous point till the entropy line intersects the desired pressure line to which steam is being expanded or compressed. When using the calculator of the present invention he merely looks down (for expansion) the indicator for the desired pressure or up the indicator (for compression).

To follow an isothermal from one point to another on the Mollier Diagram the operator must follow a temperature line till the line intersects the desired pressure line. Using the calculator of the present invention, the indicator is turned till the temperature line meets the desired pressure point.

The same procedure is followed with the calculator of the present invention for a throttling and constant quality process where the operator follows an enthalpy line or a quality line with the indicator until the line meets the desired point on the indicator. And for a constant pressure process, the point on the indicator is found first, the indicator is then turned till this point meets the desired temperature, enthalpy, or quality line as the case may be.

In all these operations it is easily seen that the turning indicator greatly assists the operator in finding 'points' and in moving from one point to another by means of any of the five processes mentioned above.

The novel features characteristic of this invention are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1 is a plan view of a sector of the calculating device of the present invention.

Figure 2 is a view partly in cross section showing the construction of the indicator.

Referring to the drawing, the calculator comprises a circular disc A (only part of which is shown) and an indicator B which is rotatably mounted on the disc A at the center C thereof.

The indicator B has two parallel edges D and E, one of which, D, is radial with respect to the disc. The indicator B also contains a slideable pointer F. The pointer F may be made to slide on B in any suitable way but preferably in such a way that it does not extend over the edge portions D and E of the indicator B. In the form shown the pointer F is held in slot L by means of a reduced portion which fits relatively close to the slot L. The pointers extend substantially all the way across the indicator B but do not extend beyond the edges thereof. Any other construction which holds the pointers perpendicular to the edges D and E and is slideable along the indicator B may be employed.

On the disc A three different spiral scales are shown. These spiral scales may be differentiated from one another in any known way. For example, they may be of different colors. In the form shown, however, the scale M is a feathered spiral scale and indicates the constant enthalpy line. The scale N is the full line scale and indicates constant temperature. The scale O is a dashed sign and indicates constant quality. The disc A also contains radial lines P which indicate constant entropy. If desired, the disc can also contain lines indicating other constant properties such as, for example, a spiral line indicating constant volume.

The scales which are employed on the calculator may be varied depending upon the use to which the calculator is to be put. In the device shown the pressure scale on the indicator B varies from 0.5 p. s. i. to 900 p. s. i. In the device shown the radial lines of constant entropy are so spaced that entropy values from 1.400 to 1.980, for example, may be spaced about a single calculator. The way in which the device of the present invention is employed to work a steam problem is illustrated by the following example whereby the advantages of this device over the Mollier Diagram is demonstrated.

*Example*

Suppose inlet steam at 600 p. s. i. and 900° F. is to be expanded isentropically to 4 p. s. i. We find 600 p. s. i. on the right column of the indicator and turn the indicator till the point on the indicator, where the 600 division line intersects the right hand edge of the indicator, lies on the 900° F. spiral line on the disc. Since this is a temperature line it is shown on the disc as a full line. Estimating between the two nearest enthalpy lines shown as feathered lines, we can see that the enthalpy is about 1463 B. t. u. We then wish to expand the steam isentropically to 4 p. s. i. Holding the indicator at the same position, we merely look down the right edge of the indicator to the 4 p. s. i. division line and read the enthalpy by estimating between the two nearest feathered lines on the disc to be 1013 B. t. u. and the moisture by estimating between the two nearest dashed lines to be about 11.4%. Next we desire to find the percent moisture following a constant pressure process to 1040 B. t. u. We merely turn the indicator till the 4 p. s. i. point lies on the 1040 B. t. u. line and estimate the moisture as 8.7%. We then wish to compress isentropically to saturation. The indicator is held at the last position and we find that the saturation line intersects the right edge of the indicator at 23 p. s. i. The saturation temperature is found by looking at the left hand column E on the indicator guided by the sliding mechanism previously mentioned and is found to be about 235° F. and the enthalpy is found on the disc to be 1159 B. t. u. After that, we want to heat the steam under constant saturation to 270° F. We merely move the "guide" up to 270° F. on the left column of the indicator and turn the indicator till the "guide" points on the saturation line and the enthalpy is found on the disc to be 1170 B. t. u. The pressure is read on the indicator as 40 p. s. i. Next we follow an isothermal expansion to 24 p. s. i. by merely turning the indicator till the 24 division line intersects the 270° F. line and we find the enthalpy to be 1176 B. t. u. We then conclude with a throttling process to atmospheric pressure by merely following the 1176 B. t. u. line with the indicator till it intersects the 14.7 line on the indicator and we find the final condition of steam to be superheated at 265° F.

Although the calculator is described as disc shaped, it is obvious that the outside dimensions of the device are not critical. Only a sector or section of a disc or a square or polygonal device may be employed.

The calculator illustrated is for determining the properties of steam. It is obvious, however, that it may be scaled to replace any kind of Mollier Diagram such as, for example, the Mollier Diagrams for sulfur dioxide, ammonia, "Freon," etc., which may be used as refrigerants.

The scales set out in the drawing and specification are for illustration purposes only as it is obvious that any properly calibrated sets of scales for the disc and the indicator may be employed.

Although certain specific embodiments of this invention have been shown and described, it will be understood that many modifications thereof are possible. This invention, therefore, is not to be restricted except insofar as is necessitated by the prior art and by the spirit of the appended claims.

I claim:

1. In a mechanical calculating device, the combination of a first member having at least one set of spirally arranged constant property lines for a vaporizable substance said set of spirally arranged constant property lines comprising a plurality of distinct constant property lines each having an angular extent of no more than 360°, with a second member pivotally mounted near the center of the spirally arranged lines, said second member containing a scale to indicate the pressure of the vaporizable substance to correspond with the value of the adjacent property line.

2. In a mechanical calculating device, the combination of a first member comprising at least a section of a disc, with a second member rotatably mounted at the center of said disc, a plurality of calibrated, spirally-arranged, constant property lines and a plurality of radial constant entropy lines emanating from substantially the center thereof, and a pressure scale on said second member correlated with the spiral lines of said disc member.

3. In a mechanical calculating device, the combination of a first member comprising at least a section of a disc, with a second member rotatably mounted at the center of said disc, a set of substantially spirally arranged constant enthalpy lines, a set of substantially spirally arranged constant temperature lines and a third set of substantially spirally arranged constant quality lines on said disc, and a pressure scale on said second member correlated with the spiral lines of said disc member.

4. In a mechanical calculating device, the combination of a first member having at least one set of spirally arranged constant property lines for a vaporizable substance, with a second member pivotally mounted near the center of the spirally arranged lines, said second member containing a scale to indicate the pressure of the vaporizable substance to correspond with the value of the adjacent constant property line, said second member also containing a saturation temperature scale and a slideable pointer on said rotating member adapted to span the pressure and saturation temperature scales and indicate corresponding values on the two scales.

5. In a mechanical calculating device, the combination of a first member comprising at least a section of a disc, with a second member rotatably mounted at the center of said disc, a set of substantially spirally arranged constant enthalpy lines, a set of substantially spirally arranged constant temperature lines and a third set of substantially spirally arranged constant quality lines on said disc, a pressure scale on said second member correlated with the spiral lines of said disc member, said second member also containing a saturation temperature scale and a slideable pointer on said second member adapted to span the pressure and saturation temperature scales and indicate corresponding values on the two scales.

ARTHUR MEYERHOFF.

REFERENCES CITED

The following references are of record in the file of this patent:

UNITED STATES PATENTS

| Number | Name | Date |
| --- | --- | --- |
| 1,691,104 | Zollman | Nov. 13, 1928 |